US012646705B2

(12) United States Patent
Lee et al.

(10) Patent No.: US 12,646,705 B2
(45) Date of Patent: Jun. 2, 2026

(54) ANODE ACTIVE MATERIAL FOR SECONDARY BATTERY, METHOD OF PREPARING THE SAME AND SECONDARY BATTERY INCLUDING THE SAME

(71) Applicant: SK ON CO., LTD., Seoul (KR)

(72) Inventors: Mi Ryeong Lee, Daejeon (KR); Hee Gyoung Kang, Daejeon (KR); Gi Hyeon Moon, Daejeon (KR); Jong Hyuk Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 827 days.

(21) Appl. No.: 17/737,222

(22) Filed: May 5, 2022

(65) Prior Publication Data

US 2022/0359864 A1    Nov. 10, 2022

(30) Foreign Application Priority Data

May 10, 2021    (KR) ........................ 10-2021-0060142

(51) Int. Cl.
| | |
|---|---|
| *H01M 4/36* | (2006.01) |
| *H01M 4/133* | (2010.01) |
| *H01M 4/134* | (2010.01) |
| *H01M 4/38* | (2006.01) |
| *H01M 4/587* | (2010.01) |
| *H01M 4/62* | (2006.01) |

(Continued)

(52) U.S. Cl.
CPC ........... *H01M 4/366* (2013.01); *H01M 4/133* (2013.01); *H01M 4/134* (2013.01); *H01M 4/386* (2013.01); *H01M 4/587* (2013.01); *H01M 4/622* (2013.01); *H01M 4/623* (2013.01); *H01M 4/624* (2013.01); *H01M 4/625* (2013.01); *H01M 2004/027* (2013.01); *H01M 10/052* (2013.01)

(58) Field of Classification Search
None
See application file for complete search history.

(56) References Cited

U.S. PATENT DOCUMENTS

| | | | | |
|---|---|---|---|---|
| 2005/0064289 A1 * | 3/2005 | Suzuki | .................. | H01M 4/139 |
| | | | | 252/182.1 |
| 2005/0208380 A1 * | 9/2005 | Park | ...................... | H01M 4/626 |
| | | | | 252/182.1 |

(Continued)

FOREIGN PATENT DOCUMENTS

| | | |
|---|---|---|
| CN | 109411713 A | 3/2019 |
| KR | 10-2014-0106292 A | 9/2014 |

(Continued)

OTHER PUBLICATIONS

Office Action for Korean Patent Application No. 10-2021-0060142 issued by the Korean Patent Office on Sep. 25, 2025.

*Primary Examiner* — Mary Grace Byram
(74) *Attorney, Agent, or Firm* — IP & T GROUP LLP

(57) ABSTRACT

An anode active material for a secondary battery according to an embodiment of the present invention includes a core particle, a polymer coating formed on a surface of the core particle, and conductive particles formed on the polymer coating. The conductive particles have an average particle diameter greater than a thickness of the polymer coating. The anode active material and a secondary battery having improved stability and reduced resistance are provided using the polymer coating and the conductive particles.

13 Claims, 2 Drawing Sheets

(51) Int. Cl.
     *H01M 4/02*          (2006.01)
     *H01M 10/052*        (2010.01)

(56)                    References Cited

U.S. PATENT DOCUMENTS

2010/0323242 A1* 12/2010 Choi ..................... H01M 4/42
                                                      526/341
2014/0205898 A1*  7/2014 Lee ..................... H01M 4/1391
                                                      427/126.6
2014/0242461 A1   8/2014 Hwang et al.
2018/0212277 A1   7/2018 Park et al.
2018/0287142 A1* 10/2018 Zhamu ................. H01M 4/366
2018/0375089 A1* 12/2018 Gonser ............ H01M 10/0567
2020/0020934 A1*  1/2020 Sung ...................... C01G 51/42
2020/0058955 A1*  2/2020 Asakawa ............. C07F 13/005
2022/0158176 A1*  5/2022 Jiang .................... H01M 4/366

FOREIGN PATENT DOCUMENTS

KR    10-2017-0099748 A    9/2017
KR    10-2018-0063853 A    6/2018
KR    10-2019-0127944 A   11/2019
WO       2013/031487 A1    3/2013

* cited by examiner

FIG. 1

ANODE ACTIVE MATERIAL FOR SECONDARY BATTERY, METHOD OF PREPARING THE SAME AND SECONDARY BATTERY INCLUDING THE SAME

CROSS-REFERENCE TO RELATED APPLICATION

This application claims priority to Korean Patent Application No. 10-2021-0060142 filed on May 10, 2021 in the Korean Intellectual Property Office (KIPO), the entire disclosure of which is incorporated by reference herein.

BACKGROUND

1. Field

The present invention relates to an anode active material for a secondary battery, a method of preparing the same, and a secondary battery including the same. More particularly, the present invention relates to an anode active material for a secondary batter including different types of particles, a method of preparing the same, and a secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape for accommodating the electrode assembly and the electrolyte.

For example, the anode may include a carbon-based active material or silicon-based active material particles as an anode active material. When the battery is repeatedly charged/discharged, a side reaction of active material particles may occur due to a contact with the electrolyte, and mechanical and chemical damages such as particle cracks may be caused.

If a composition and a structure of the anode active material are changed to improve stability of the active material particles, a conductivity may be degraded and a power of the secondary battery may be deteriorated.

Thus, developments of the anode active material capable of enhancing life-span stability and power/capacity properties are needed.

For example, Korean Published Patent Application No. 2017-0099748 discloses an electrode assembly for a lithium secondary battery and a lithium secondary battery including the same.

SUMMARY

According to an aspect of the present invention, there is provided an anode active material for a secondary battery having improved stability and electrical property.

According to an aspect of the present invention, there is provided a method of preparing an anode active material for a secondary battery having improved stability and electrical property.

According to an aspect of the present invention, there is provided a secondary battery having improved stability and electrical property.

According to exemplary embodiments of the present invention an anode active material for a secondary battery includes a core particle, conductive particles formed on the core particle, and a polymer coating layer formed on the core particle and the conductive particles. The polymer coating layer includes a crown ether compound.

In some embodiments, the core particle may include a graphite-based material, an amorphous carbon-based material or a silicon-based material.

In some embodiments, the conductive particles may cover at least a portion of a surface of the core particle.

In some embodiments, at least some of the conductive particles may be inserted into the core particle.

In some embodiments, at least some of the conductive particles are inserted into the polymer coating layer and are in contact with the core particle.

In some embodiments, the conductive particles may include at least one selected from the group consisting of lithium titanate (LTO), Super P, carbon black, acetylene black, Ketjen black, carbon flake, activated carbon, graphene, carbon nanotube (CNT), carbon nanofiber (CNF), a metal fiber and a metal particle.

In some embodiments, the polymer coating layer may include a polymer having a weight average molecular weight of 50,000 or more and less than 500,000.

In some embodiments, the polymer coating layer further include a binder material.

In some embodiments, the binder material may include at least one selected from the group consisting of polyvinylidene fluoride, polyacrylonitrile, polyvinyl alcohol, polyacrylamide, polymethyl methacrylate and polyvinylchloride.

In some embodiments, the crown ether compound may be dispersed in the polymer coating layer in a form of a monomer or an oligomer.

In some embodiments, the crown ether compound contains a nitrogen atom (N) or a sulfur atom (S).

In some embodiments, the crown ether compound may include at least one selected from the group consisting of 12-crown-4, benzo-12-crown-4, tetrathia-12-crown-4, aza-12-crown-4, diaza-12-crown-4, 14-crown-4, tetrathia-14-crown-4, benzo-14-crown-4, dibenzo-14-crown-4, didecalino-14-crown-4, decalino-14-crown-4, 15-crown-5, aza-15-crown-5, diaza-15-crown-5, benzo-15-crown-5, dibenzo-15-crown-5, cyclohexane-15-crown-5, 16-crown-4, 16-crown-5, 18-crown-6, hexathia-18-crown-6, aza-18-crown-6, diaza-18-crown-6, benzo-18-crown-6 and dibenzo-18-crown-6.

In some embodiments, an amount of the crown ether compound may be in a range from 0.05 wt % to 5 wt % relative to a weight of the core particle.

According to exemplary embodiments of the present invention, a secondary battery includes an anode including the anode active material for a secondary battery according to embodiments as described above, and a cathode facing the anode.

In a method of preparing an anode active material for a secondary battery, a core particle is surface treated with conductive particles. A polymer coating layer is formed using a coating solution that contains a binder material and a crown ether compound on the core particle surface-treated with the conductive particles.

In some embodiments, the surface treating may include agitating the conductive particles with the core particle at a first rotational speed, and the forming the polymer coating layer may include agitating the coating solution and the core particle surface-treated with the conductive particles at a second rotational speed. The first rotational speed may be greater than the second rotational speed.

In an anode active material according to exemplary embodiments, conductive particles may be formed on a core particle, and a polymer coating layer including a crown ether compound may be formed on the core particle and the conductive particles. An electron transfer path may be formed through the conductive particles, so that high capacity and high rate properties may be achieved.

Side reactions and damage such as cracks on an outer surface of the core particle providing an anode activity may be prevented by the polymer coating layer, thereby improving a life-span stability.

Further, an electron or lithium ion path may be formed in the polymer coating layer through the crown ether compound to prevent an increase of resistance due to the polymer coating layer and to improve both an electronic conductivity and an ionic conductivity.

BRIEF DESCRIPTION OF THE DRAWINGS

FIG. 1 is a schematic cross-sectional view illustrating an anode active material for a secondary battery in accordance with exemplary embodiments.

DETAILED DESCRIPTION OF THE EMBODIMENTS

Figure 2:
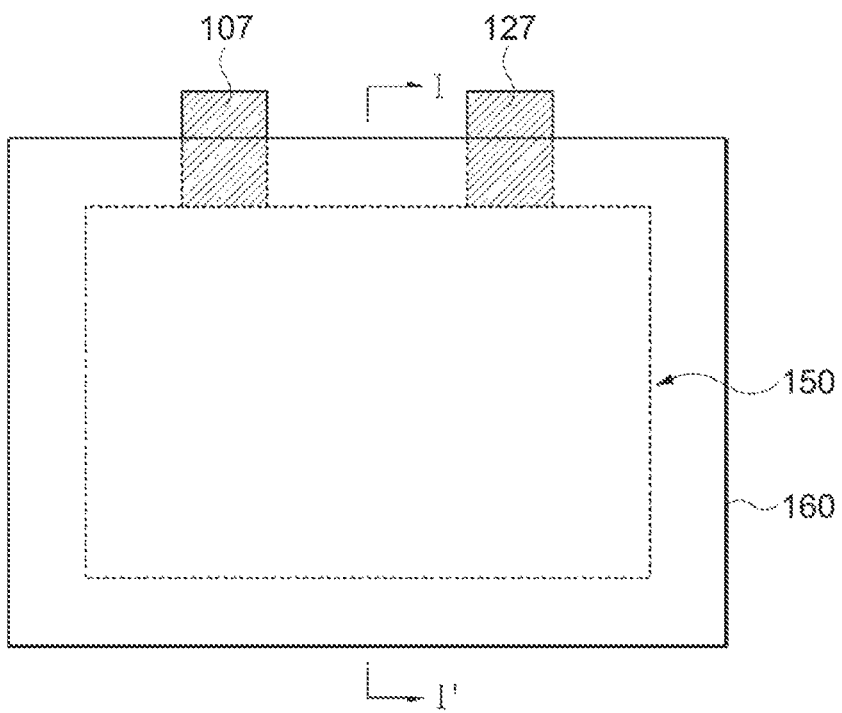
FIG. 2 is a schematic top planar view illustrating a secondary battery according to exemplary embodiments.

According to exemplary embodiments of the present invention, an anode active material for a secondary battery which includes a core particle, conductive particles formed on the core particle, and a polymer coating layer being formed on the core particle and the conductive particles and including a crown ether compound, and a method of preparing the anode active material are provided. Further, a secondary battery including the anode active material is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
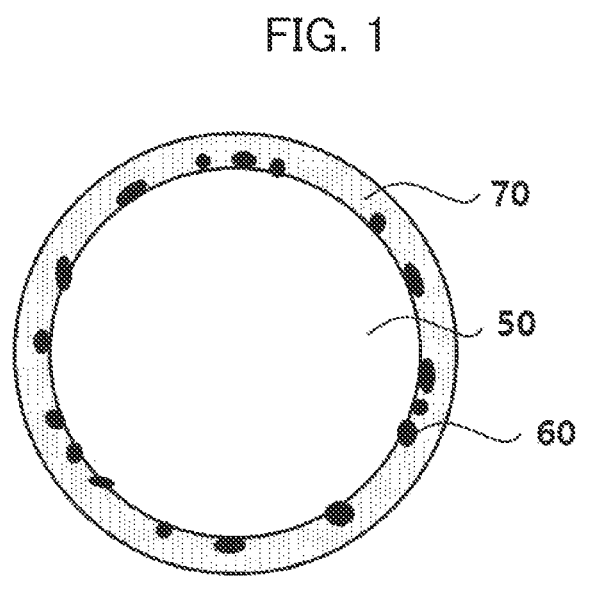

FIG. 1 is a schematic cross-sectional view illustrating an anode active material for a secondary battery according to exemplary embodiments. For example, FIG. 1 schematically illustrate a structure including one core particle. For example, a plurality of the core particles may form an anode active material.

Referring to FIG. 1, an anode active material for a secondary battery (hereinafter, which may be abbreviated as an anode active material) may include a core particle 50, conductive particles 60, and a polymer coating layer 70.

The core particle 50 may serve as a main particle that provides a substantial anode activity. For example, the core particle 50 may include an amorphous carbon-based material derived from hard carbon, cokes, pitch, or the like; a graphite-based material such as natural graphite, artificial graphite, or the like; a silicon-based material, etc. These may be used alone or in a combination of two or more therefrom.

In some embodiments, the core particle 50 may include a graphite-based material such as natural graphite and/or artificial graphite. Preferably, the core particle 50 may include artificial graphite. Artificial graphite may provide a lower capacity than that of natural graphite, but may have relatively high chemical and thermal stability. Accordingly, artificial graphite may be employed as the core particle 50, so that high-temperature storage or high-temperature life-span properties of a secondary battery may be improved. Further, power or capacity properties of the artificial graphite-based core particle 50 may be sufficiently increased by including the conductive particles 60 as will be described below.

In some embodiments, the core particle 50 may include a silicon-based active material. The silicon-based active material may include silicon (Si), SiOx (0<x<2), or a SiOx (0<x<2) containing a lithium compound or a magnesium compound.

In an embodiment, the SiOx containing the Li compound or the magnesium compound may be a SiOx pre-treated with lithium or magnesium. For example, the SiOx containing the Li compound or the magnesium compound may include lithium silicate or magnesium silicate.

In some embodiments, the core particle 50 may include a silicon-carbon-based active material. The silicon-carbon-based active material may include, e.g., silicon carbide (SiC) or a silicon-carbon particle having a core-shell structure.

The silicon-carbon particle may be formed by, e.g., depositing a silicon layer on a surface of a graphite core. In an embodiment, the silicon-carbon particle may be formed by coating a silicon layer on a commercially available graphite particle through a chemical vapor deposition (CVD) process using a silicon precursor compound such as a silane-based compound.

In some embodiments, the core particle 50 may include an amorphous carbon-based material derived from hard carbon, cokes, pitch, or the like. In an embodiment, the core particle 50 may include a mixture of two or more of the aforementioned graphite-based active material, silicon-based active material or amorphous carbon-based material. For example, the core particle 50 may have a core-shell structure in which at least a portion of an outer surface of the graphite-based material or the silicon-based material is coated with the amorphous carbon-based material.

An average particle diameter ($D_{50}$) of the core particle 50 may be from about 1 μm to 100 μm. $D_{50}$ may refer to a particle diameter at 50% of a volume fraction in a volumetric cumulative particle size distribution. Preferably, the average particle diameter ($D_{50}$) of the core particle 60 may be from about 5 μm to 20 μm.

The conductive particles 60 may be formed on a surface of the core particle 50. For example, the conductive particles 60 may be attached to a surface of the core particle 50, in some embodiments, at least some of the conductive particles 60 may be inserted at an inside of the core particle 50.

In some embodiments, the conductive particles 60 may be discontinuously distributed on the surface of the core particle 50. For example, the conductive particles 60 may exist in the form of an island in a local area of an outer surface of the core particle 50.

In some embodiments, the conductive particles 60 may be continuously and uniformly distributed on the surface of the core particle 50. For example, the conductive particles 60 may exist in the form of a film covering at least a portion of the surface of the core particle 50.

In some embodiments, the conductive particles 60 may substantially completely surround the surface of the core particle 50 to form a substantially single-layer coating. In this case, a conductive coating layer including the conductive particles 60 may be formed on the core particle 50, and the polymer coating layer 70 to be described later may be formed on the conductive coating layer.

The conductive particles 60 may be formed on the core particle 50 in the above-described shape, so that the electron/ion path through the anode active material may be added, and the electronic conductivity and ionic conductivity may be improved.

In some embodiments, at least some the conductive particles 60 may be inserted into the polymer coating layer 70. For example, at least some of the conductive particles 60 may be inserted into the polymer coating layer 70 to be in contact with the surface of the core particle 50. Further, at least some of the conductive particles 60 may be inserted into the polymer coating layer 70 and also inserted into the core particle 50.

Accordingly, high capacity properties of the anode active material may be achieved without deteriorating mechanical/chemical stability and life-span properties.

For example, the conductive particles 60 may be inserted into the polymer coating layer 70 to be in contact with the crown ether compound at an inside the polymer coating layer 70, so that a transfer path of ions/electrons may be provided to enhance the power/capacity.

The conductive particles 60 may include lithium titanate (LTO), Super P, carbon black, acetylene black, Ketjen black, a carbon flake, activated carbon, graphene, carbon nanotube (CNT), carbon nanofiber (CNF), a metal fiber, a metal particle, etc. These may be included alone or in combination of two or more therefrom.

In some embodiments, a weight of the conductive particles 60 relative to the total weight of the core particle 50 may be in a range from 0.01 wt % to 5 wt %, preferably from 0.03 wt % to 2 wt %. Within the above range, a sufficient conductive path may be added without inhibiting the anode activity of the core particle 50.

The polymer coating layer 70 may be formed on the core particle 50 and the conductive particles 60. For example, the polymer coating layer 70 may partially cover outer surfaces of the core particle 50 and the conductive particles 60. For example, the core particle 50 and the conductive particles 60 may be entirely surrounded by the polymer coating layer 70.

In some embodiments, the polymer coating layer 70 may be formed on a conductive coating layer including the conductive particles 60. For example, the outer surface of the core particle 50 may be substantially entirely surrounded by the conductive coating layer, and an outer surface of the conductive coating layer may be substantially entirely surrounded by the polymer coating layer 70.

The polymer coating layer 70 may cover the core particle 50 and the conductive particles 60, so that a side reactions, an oxidation, a corrosion, cracks, etc., at the surface of the core particle 50 or the surface of the conductive particles may be reduced or prevented. For example, as charging/discharging of the secondary battery is repeated, the surface of the core particle 50 may be mechanically/chemically damaged. Further, while the surface of the core particle 50 is in contact with the electrolyte, a gas generation may be caused by the side reaction.

In exemplary embodiments, the polymer coating layer 70 may protect the surface of the core particle 50 or the conductive particles 60, so that the damages and side reaction caused by a direct exposure to the electrolyte may be suppressed. Additionally, the polymer coating layer 70 may serve as an elastic material that relieves an expansion of the core particle 50. Accordingly, a swelling of the core particle 50 due to the repeated charging/discharging, and cracks in the core particle 50 due to the expansion may also be suppressed.

In exemplary embodiments, the polymer coating layer 70 may include a binder material. Accordingly, the crown ether compound may be stably included in the polymer coating layer 70 while preventing mechanical/chemical damages to the core particle 50.

The binder material may include a polymer such as polyvinylidene fluoride, polyacrylonitrile, polyvinyl alcohol, polyacrylamide, polymethyl methacrylate, polyvinyl chloride, etc. These may be used alone or in combination of two or more therefrom.

Preferably, the polymer coating layer 70 may include polyvinylalcohol, Tn this case, the crown ether compound may be stably dispersed in the polymer coating layer 70 by forming a hydrogen bond between a hydroxyl group includes in polyvinyl alcohol and the crown ether compound. Accordingly, the ionic conductivity may be further improved, In some embodiments, a weight average molecular weight (Mw) of the binder material included in the polymer coating layer 70 may be less than 500,000 g/mol, preferably in a range from 50,000 g/mol to 300,000 g/mol. Within the above range, a sufficient flexibility for the insertion of the conductive particles may be achieved by the polymer coating layer 70 while suppressing the swelling and expansion of the core particle 50.

In some embodiments, an amount of the binder material relative to the total weight of the core particle 50 may be in a range from about 0.1 wt % to 5 wt %, preferably from 0.1 wt % to 2 wt %. If the amount of the binder material is less than about 0.1 wt %, a uniform protective film formation may not be substantially implemented, and a sufficient inhibition of the side reaction may not be provided. If the amount of the binder material exceeds about 5 wt %, the capacity properties may be degraded due to an excessive increase of the coating amount.

In some embodiments, a thickness of the polymer coating layer 70 may be in a range from 1 nm to 100 nm, preferably from 10 nm to 100 nm, more preferably from 10 nm to 80 nm. Within the above range, mechanical/chemical stability may be improved without degrading the high-capacity properties of the core particle 50.

The polymer coating layer 70 may include the crown ether compound. The crown ether compound may have a high conductivity to the lithium ions, so that the ionic conductivity of the anode active material may be supplemented. Accordingly, a reduction of power and capacity due to the polymer coating layer 70 may be prevented.

The crown ether compound may serve as a host material for a guest ion e.g., the lithium ion). For example, the crown ether compound may selectively bind and absorb/release a metal cation (e.g., the lithium ion), so that an ion mobility in the polymer coating layer 70 may be enhanced.

In exemplary embodiments, the crown ether compound may be dispersed or blended in the polymer coating layer 70 to exist in the form of a mixture with the binder material. For example, a polymer matrix in which the crown ether compound is dispersed may be coated on the core particle 50 to form the polymer coating layer 70.

In exemplary embodiments, the crown ether compound may be polymerized or crosslinked with the binder material included in the polymer coating layer 70 to form a film. For example, the core particle 50 may be coated with a monomer of the binder material and the crown ether compound, and the polymerization and crosslinking of the materials may be performed on the surface of the core particle 50. In this case, the polymer coating layer 70 may include substantially a polymer of the above-described binder material and the crown ether compound.

Preferably, the crown ether compound may be present in the form of a monomer or an oligomer, and may be dispersed in the polymer coating layer 70. In this case, the crown ether compound may be uniformly distributed in the polymer coating layer 70 and may have a mobility, so that an electron/ion migration path may be sufficiently obtained.

In some embodiments, the crown ether compound may include a macrocyclic ring in a molecular structure thereof. For example, the macrocyclic ring may have a repeating unit of —$R_1$—$R_2$—O— structure. $R_1$ and $R_2$ may be each independently a single bond, an alkylene group having 1 to 6 carbon atoms, a cycloalkylene group having 3 to 12 carbon atoms, a bicycloalkylene group having 4 to 12 carbon atoms, an arylene group having 6 to 12 carbon atoms, a carbonyl group, an ester group, an amide group, or the like.

For example, the crown ether compound may be represented by n-crown-m, and n represents the total number of atoms included in the macrocyclic ring, and m represents the number of oxygen atoms included in the macrocyclic ring. Here, n and m may each independently be an integer of 2 or more.

In some embodiments, the crown ether compound may include a nitrogen atom (N) or a sulfur atom (S). For example, at least one of the oxygen atoms included in the crown ether compound may be substituted with a nitrogen atom or a sulfur atom. For example, at least one of the oxygen atoms of the macrocyclic ring may be substituted with the nitrogen atom or the sulfur atom.

In some embodiments, the crown ether compound may include at least one of a 12-crown ether to a 18-crown ether containing one or more oxygen atom, nitrogen atom or sulfur atom. For example, the crown ether compound may include the macrocyclic ring having 12 to 18 atoms in the molecular structure thereof, and at least one oxygen atom in the macrocyclic ring may be substituted with the nitrogen atom or the sulfur atom.

The macrocyclic ring of the crown ether compound may serve as a cavity for receiving the guest ion (e.g., the lithium ion). For example, the crown ether compound may have a strong binding force or affinity to a cation by a plurality of hetero atoms included in the macrocyclic ring.

For example, the hetero atom included in the macrocyclic ring has a lone pair of electrons, and thus the crown ether compound may have a strong negative charge at an inside of the ring. Accordingly, the metal cation deficient in electrons may be easily coordinated with the crown ether compound to form a complex. Thus, the electron/ion mobile path may be effectively provided in the polymer coating layer by the crown ether compound.

In some embodiments, the crown ether compound may include a carbonyl group, an ester group or an amide group in the molecular structure thereof. For example, at least one of carbon atoms in the crown ether compound may be substituted or connected with the carbonyl group, the ester group or the amide group.

In some embodiments, the crown ether compound may include 12-crown-4, benzo-12-crown-4, tetrathia-12-crown-4, aza-12-crown-4, diaza-12-crown-4, 14-crown-4, tetrathia-14-crown-4, benzo-14-crown-4, dibenzo-14-Crown-4, didecalino-14-crown-4, decalino-14-crown-4, 15-crown-5, aza-15-crown-5, diaza-15-crown-5, benzo-15-crown-5, dibenzo-15-crown-5, cyclohexane-15-crown-5, 16-crown-4, 16-crown-5, 18-crown-6, hexathia-18-crown-6, aza-18-crown-6, diaza-18-crown-6, benzo-18-Crown-6, dibenzo-18-crown-6, etc. These may be used alone or in combination of two or more therefrom.

In some embodiments, an amount of the crown ether compound relative to the total weight of the core particle 50 may be in a range from about 0.05 wt % to 5 wt %. If the content of the crown ether compound is less than 0.05 wt %, the sufficient number of the crown ether compounds relative to the eluted lithium ions may not be provided. If the content of the crown ether compound exceeds 5 wt %, a resistance may be increased or a side reaction may occur due to the crown ether compound.

Preferably, the content of the crown ether compound may be from 1 wt % to 3 wt %. Within the above range, the sufficient ion conductive path may be achieved without inhibiting the anode activity of the core particle 50.

In some embodiments, the polymer coating layer 70 may include the binder material and the crown ether compound, and the crown ether compound may be included in an amount from 10 wt % to 90 wt % by weight based on the total weight of the polymer coating layer 70. Preferably, the amount of the crown ether compound may be in a range from 30 wt % to 80 wt %. Within the above range, sufficient electron/ion channels may be formed while achieving mechanical/chemical stability by the polymer coating layer 70.

According to exemplary embodiments, the anode active material may be manufactured according to a method and a process as described below.

For example, The above-described core particle 50, the conductive particles 60, the binder material and the crown ether compound may each be prepared.

Thereafter, the conductive particles may be formed on the core particle 50 through a surface treatment. In some embodiments, the surface treatment may be performed by a dry surface treatment or a wet surface treatment. For example, the core particle 50 and the conductive particle 60 may be dry-mixed or wet-mixed. During the mixing, stress and heat may be generated by a friction between the core particle 50 and the conductive particle 60, and the conductive particle 60 may be attached to at least a portion of the surface of the core particle 50.

In some embodiments, the conductive particles 60 may be distributed in the form of individual islands on the surface of the core particle 50, or a conductive coating layer having a film shape that may partially or entirely surrounding the surface of the core particle 50 may be formed.

The dry mixing may be performed using, e.g., a ball mill, a roller mill, a high energy mill, a stirred mill, a planetary mill, a vibration mill, a Nobilta mill, a mechano-fusion, a high speed mixing, etc.

The wet mixing may be performed using, e.g., a spray method, a co-precipitation method or a dipping method.

After the surface treatment, the polymer coating layer 70 including the crown ether compound may be formed through a wet coating. For example, a coating solution containing the binder material and the crown ether compound may be wet-mixed with the core particle 50 surface-treated with the conductive particles 60 to form the polymer coating layer 70.

In some embodiments, the surface treatment (e.g., the dry mixing) may be performed at a first rotational speed, and the wet coating may be performed at a second rotational speed. The first rotational speed may be in a range from about 500 rpm to 10,000 rpm, preferably from about 1,000 rpm to 6,000 rpm. The second rotational speed may be in a range from about 1 Hz to 50 Hz, preferably from about 5 Hz to 30 Hz. In some embodiments, the first rotational speed may be greater than the second rotation speed.

Within the above range of the first rotational speed, the conductive particles 60 may be stably attached to the surface of the core particle 50 while suppressing an abrasion of the core particle 50. Within the above range of the second rotational speed, the polymer coating layer 70 may be formed without damaging the conductive particles 60 formed on the surface of the core particle 50.

Figure 3:
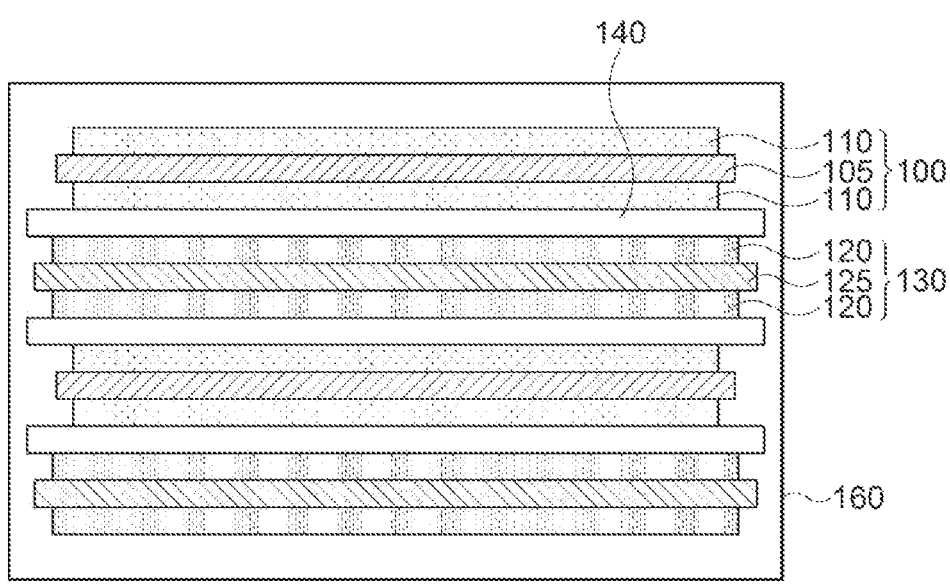
FIG. 3 is a schematic cross-sectional view illustrating a secondary battery according to exemplary embodiments.

FIGS. 2 and 3 are a schematic top planar view and a schematic cross-sectional view, respectively, illustrating a secondary battery according to exemplary embodiments. For example, FIG. 3 is a cross-sectional view taken along a line I-I' of FIG. 2 in a thickness direction of the lithium secondary battery.

Referring to FIGS. 2 and 3, the secondary battery may serve as a lithium secondary battery, in exemplary embodiments, the secondary battery may include an electrode assembly 150 and a case 160 accommodating the electrode assembly 150. The electrode assembly 150 may include an anode 100, a cathode 130 and a separation layer 140.

The cathode 100 may include a cathode current collector 105 and a cathode active material layer 110 formed on at least one surface of the cathode current collector 105. In exemplary embodiments, the cathode active material layer 110 may be formed on both surfaces e.g., upper and lower surfaces) of the cathode current collector 105. For example, the cathode active material layer 110 may be coated on each of the upper and lower surfaces of the cathode current collector 105, and may be directly coated on the surface of the cathode current collector 105.

The cathode current collector 105 may include stainless-steel, nickel, aluminum, titanium, copper or an alloy thereof. Preferably, aluminum or an alloy thereof may be used.

The cathode active material layer 110 may include a lithium metal oxide as a cathode active material. In exemplary embodiments, the cathode active material may include a lithium (Li)-nickel (Ni)-based oxide.

In some embodiments, the lithium metal oxide included in the cathode active material layer 110 may be represented by Chemical Formula 1 below.

$$Li_{1+a}Ni_{1-(x+y)}Co_xM_yO_2 \qquad \text{[Chemical Formula 1]}$$

In the Chemical Formula 1 above, $-0.05 \leq a \leq 0.15$, $0.01 \leq x \leq 0.2$, $0 \leq y \leq 0.2$, and M may include at least one element selected from Mn, Mg, Sr, Ba, B, Al, Si, Ti, Zr and W. In an embodiment, $0.01 \leq x \leq 0.20$, $0.01 \leq y \leq 0.15$ in Chemical Formula 1.

Preferably, in Chemical Formula 1, M may be manganese (Mn). In this case, nickel-cobalt-manganese (NCM)-based lithium oxide may be used as the cathode active material.

For example, nickel (Ni) may serve as a metal related to a capacity of a lithium secondary battery. As the content of nickel increases, capacity of the lithium secondary battery may be improved. However, if the content of nickel is excessively increased, life-span may be decreased, and mechanical and electrical stability may be degraded.

For example, cobalt (Co) may serve as a metal related to conductivity or resistance, and power of the lithium secondary battery. In an embodiment, M may include manganese (Mn), and Mn may serve as a metal related to mechanical and electrical stability of the lithium secondary battery.

Power, low resistance and life-span stability may be improved together from the cathode active material layer 110 by the above-described interaction between nickel, cobalt and manganese.

For example, a slurry may be prepared by mixing and stirring the cathode active material with a binder, a conductive material and/or a dispersive agent in a solvent. The slurry may be coated on the cathode current collector 105, and then dried and pressed to form the cathode active material layer 110.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene, rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material or lithium metal oxide particles may be relatively increased. Thus, capacity and power of the lithium secondary battery may be further improved.

The conductive material may be added to facilitate an electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In some embodiments, an electrode density of the cathode 100 may be in a range from 3.0 g/cc to 3.9 g/cc, preferably from 3.2 g/cc to 3.8 g/cc.

The anode 130 may include an anode current collector 125 and an anode active material layer 120 formed on at least one surface of the anode current collector 125. In exemplary embodiments, the anode active material layer 120 may be formed on both surfaces (e.g., upper and lower surfaces) of the anode current collector 125. The anode active material layer 120 may be coated on each of the upper and lower surfaces of the anode current collector 125. For example, the anode active material layer 120 may directly contact the surface of the anode current collector 125.

The anode current collector 125 may include gold, stainless steel, nickel, aluminum, titanium, copper, or an alloy thereof, preferably may include copper or a copper alloy.

In exemplary embodiments, the anode active material layer 120 may include the anode active material according to the above-described exemplary embodiments. For example, the anode active material may be included in an amount ranging from 80 wt % to 99 wt % based on a total weight of the anode active material layer 120. Preferably, the amount of the anode active material may be in a arrange from 90 wt % to 98 wt % based on the total weight of the anode active material layer 120.

For example, an anode slurry may be prepared by mixing and stirring the anode active material with a binder, a conductive material and/or a dispersive agent in a solvent. The anode slurry may be applied (coated) on the anode current collector 125, and then dried and pressed to form the anode active material layer 120.

The binder and the conductive material substantially the same as or similar to those used for forming the cathode 100 may be used in the anode 130. In some embodiments, the binder for forming the anode 130 may include, e.g., styrene-butadiene rubber (SBR) or an acrylic binder for compatibility with the graphite-based active material, and carboxymethyl cellulose (CMC) may also be used as a thickener.

In exemplary embodiments, an electrode density of the anode active material layer 120 may be 1.4 g/cc to 1.9 g/cc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation to further improve power and capacity of the secondary battery.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

The separation 140 may extend in a width direction of the secondary battery between the cathode 100 and the anode 130, and may be folded and wound along a thickness direction of the lithium secondary battery. Accordingly, a plurality of the anodes 100 and the cathodes 130 may be stacked in the thickness direction using the separation layer 140.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding of the separation layer 140.

The electrode assembly 150 may be accommodated together with an electrolyte in the case 160 to define the lithium secondary battery. The case 160 may include, e.g., a pouch, a can, etc.

In exemplary embodiments, a non-aqueous electrolyte may be used as the electrolyte.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5$ $PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 2, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

FIG. 2 illustrates that the cathode lead 107 and the anode lead 127 are positioned at the same side of the lithium secondary battery or the case 160, but the cathode lead 107 and the anode lead 127 may be formed at opposite sides to each other.

For example, the cathode lead 107 may be formed at one side of the case 160, and the anode lead 127 may be formed at the other side of the case 160.

The lithium secondary battery may be manufactured in, e.g., a cylindrical shape using a can, a square shape, a pouch shape or a coin shape.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

(1) Fabrication of Anode

Artificial graphite particles ($D_{50}$: 10 μm) and Super P ($D_{50}$: 200 nm) were added to a mechano-fusion device in a weight ratio of 99.5%:0.5%. Thereafter, a high-speed surface treatment was performed for 10 min at a stirring speed of 1,100 rpm.

100 g of the surface-treated artificial graphite particles were put into a mixer (manufactured by Inoue) together with a mixed solution containing 4 g of 18-crown-6-ether and 37.5 g of a 1.5% aqueous solution of polyvinyl alcohol (PVA) (Mw: about 180,000). Thereafter, the mixture was mixed for 2 hours at a stirring speed of 20 Hz, and then dried at 60° C. in a vacuum state to prepare an anode active material.

An anode slurry was prepared by mixing the prepared anode active material, CMC and SBR in a weight ratio of 97.3:1.2:1.5. The anode slurry was coated on a Cu foil, dried and pressed to prepare an anode having a mixture density of 10 mg/cm² and 1.7 g/cc.

(2) Fabrication of Cathode $LiNi_{0.8}Co_{0.1}Mn_{0.1}O_2$ as a cathode active material, carbon black as a conductive material and polyvinylidene fluoride (PVDF) as a binder were mixed in a weight ratio of 92:5:3 to prepared a cathode slurry. The cathode slurry was coated on an aluminum substrate, dried and pressed to form a cathode.

(3) Fabrication of Secondary Battery

The cathode and the anode as prepared above were disposed with a polyethylene (PE) separator (13 μm) interposed therebetween to form an electrode cell, and the electrode cells were stacked to form an electrode assembly. The electrode assembly was accommodated in a pouch, and electrode tab portions were welded. Thereafter, a 1M $LiPF_6$, solution in a mixed solvent of ethylene carbonate/ethylmethyl carbonate (EC/EMC: 3/7; volume ratio) was injected as an electrolyte, and then sealed to prepare a secondary battery.

Example 2

A secondary battery was fabricated by the same method as that in Example 1, except that 0.05 g of 18-crown-6-ether was included when preparing the anode active material.

Example 3

A secondary battery was fabricated by the same method as that in Example 1, except that 10 g of 18-crown-6-ether was included when preparing the anode active material.

Example 4

A secondary battery was fabricated by the same method as that in Example 1, except that 4 g of 12-crown-4-ether was included instead of 18-crown-6-ether when preparing the anode active material.

Comparative Example 1

A secondary battery was fabricated by the same method as that in Example 1, except that artificial graphite on which the formation of a EVA coating layer including 18-crown-6-ether and Super-P was omitted was used as an anode active material.

Comparative Example 2

A secondary battery was fabricated by the same method as that in Example 1, except that 18-crown-6-ether was not included in the PVA coating layer when preparing the anode active material.

Comparative Example 3

A secondary battery was fabricated by the same method as that in Example 1, except that 4 g of LiOH was used instead of 18-crown-6-ether when preparing the anode active material.

Comparative Example 4

A secondary battery was fabricated by the same method as that in Example 1, except that formation of Super-P was omitted was used as an anode active material.

Experimental Example (1) Initial Efficiency Evaluation

Charging (CC/CV 0.5C 4.2V 0.05C CUT-OFF) and discharging (CC 0.5 C 2.5V CUT-OFF) were performed using the secondary batteries according to Examples and Comparative Examples to measure an initial charge/discharge capacity (CC: Constant Current, CV: Constant Voltage).

An initial efficiency was evaluated as a percentage of the initial discharge capacity relative to the initial charge capacity.

The evaluation results are shown in Table 1 below.

(2) Evaluation on Capacity Retention

Charging (CC/CV, 0.5 C, an upper limit voltage 4.2V, a cut-off current 0.050 C) and discharging (CC, 0.5 C, a lower limit voltage 2.5V cut-off) at 25° C. for secondary batteries according to Examples and Comparative Examples were set as one cycle, an 500 cycles were repeated. Thereafter, a capacity retention was evaluated as a percentage of a discharge capacity at a 500th cycle relative to a discharge capacity at a 1st cycle.

The evaluation results are shown in Table 1 below.

TABLE 1

| No. | Initial Efficiency (%) | Capacity Retention @ 500 cycle (%) |
|---|---|---|
| Example 1 | 90.2 | 94.8 |
| Example 2 | 89.8 | 94.0 |
| Example 3 | 90.1 | 94.2 |
| Example 4 | 90.5 | 95.1 |
| Comparative Example 1 | 88.5 | 92.4 |
| Comparative Example 2 | 88.7 | 92.9 |
| Comparative Example 3 | 89.0 | 93.3 |
| Comparative Example 4 | 88.8 | 93.2 |

Referring to Table 1, the secondary battery of Examples including the anode active material according to exemplary embodiments as described above provided it reed the initial efficiency and life-span compared to those from Comparative Examples.

What is claimed is:

1. An anode active material for a secondary battery, comprising:

a core particle;

conductive particles formed on the core particle; and a polymer coating layer formed on the core particle and the conductive particles, the polymer coating layer comprising a crown ether compound and a binder material, wherein an amount of the crown ether compound is in a range from 0.05 wt % to 5 wt % relative to a weight of the core particle, and wherein an amount of the binder material is in a range from 0.1 wt % to 5 wt % relative to the weight of the core particle.

2. The anode active material for a secondary battery of claim 1, wherein the core particle comprises a graphite-based material, an amorphous carbon-based material or a silicon-based material.

3. The anode active material for a secondary battery of claim 1, wherein the conductive particles cover at least a portion of a surface of the core particle.

4. The anode active material for a secondary battery of claim 1, wherein at least some of the conductive particles are inserted into the core particle.

5. The anode active material for a secondary battery of claim 1, wherein at least some of the conductive particles are inserted into the polymer coating layer and are in contact with the core particle.

6. The anode active material for a secondary battery of claim 1, wherein the conductive particles comprise at least one selected from the group consisting of lithium titanate (LTO), Super P, carbon black, acetylene black, Ketjen black, carbon flake, activated carbon, graphene, carbon nanotube (CNT), carbon nanofiber (CNF), a metal fiber and a metal particle.

7. The anode active material for a secondary battery of claim 1, wherein the polymer coating layer comprises a polymer having a weight average molecular weight of 50,000 or more and less than 500,000.

8. The anode active material for a secondary battery of claim 1, wherein the binder material comprises at least one selected from the group consisting of polyvinylidene fluoride, polyacrylonitrile, polyvinyl alcohol, polyacrylamide, polymethyl methacrylate and polyvinylchloride.

9. The anode active material for a secondary battery of claim 1, wherein the crown ether compound is dispersed in the polymer coating layer in a form of a monomer or an oligomer.

10. The anode active material for a secondary battery of claim 1, wherein the crown ether compound contains a nitrogen atom (N) or a sulfur atom(S).

11. The anode active material for a secondary battery of claim 1, wherein the crown ether compound comprises at least one selected from the group consisting of 12-crown-4, benzo-12-crown-4, tetrathia-12-crown-4, aza-12-crown-4, diaza-12-crown-4, 14-crown-4, tetrathia-14-crown-4, benzo-14-crown-4, dibenzo-14-crown-4, didecalino-14-crown-4, decalino-14-crown-4, 15-crown-5, aza-15-crown-5, diaza-15-crown-5, benzo-15-crown-5, dibenzo-15-crown-5, cyclohexane-15-crown-5, 16-crown-4, 16-crown-5, 18-crown-6, hexathia-18-crown-6, aza-18-crown-6, diaza-18-crown-6, benzo-18-crown-6 and dibenzo-18-crown-6.

12. A secondary battery, comprising:

an anode comprising the anode active material for a secondary battery according to claim 1; and a cathode facing the anode.

13. The anode active material for a secondary battery of claim 1, wherein the crown ether compound comprises 18-crown-6-ether.

\* \* \* \* \*